United States Patent [19]

Chesnes et al.

[11] Patent Number: 5,666,643
[45] Date of Patent: Sep. 9, 1997

[54] HIGH TEMPERATURE BRAZE MATERIAL

[75] Inventors: Richard P. Chesnes, Owasso, Okla.; Stephen J. Ferrigno, Cincinnati; David E. Budinger, Milford, both of Ohio; Melvin R. Jackson, Schenectady, N.Y.

[73] Assignee: General Electric Company, Cincinnati, Ohio

[21] Appl. No.: 655,276

[22] Filed: May 15, 1996

Related U.S. Application Data

[63] Continuation of Ser. No. 392,565, Feb. 23, 1995, abandoned.

[51] Int. Cl.$^6$ .................................................. B22F 7/00
[52] U.S. Cl. .................... 428/549; 428/552; 428/558; 428/567; 148/528; 228/262.31; 228/262.9
[58] Field of Search .............................. 428/548, 552, 428/558, 567, 549; 148/528; 219/615, 85.1; 228/262.31, 262.9; 403/272

[56] References Cited

U.S. PATENT DOCUMENTS

| | | | |
|---|---|---|---|
| 3,759,692 | 9/1973 | Zelahy | 75/0.5 BA |
| 4,285,459 | 8/1981 | Baladjanian et al. | 228/119 |
| 4,381,944 | 5/1983 | Smith et al. | 75/255 |
| 4,478,638 | 10/1984 | Smith et al. | 75/255 |
| 4,752,537 | 6/1988 | Das | 428/614 |
| 4,830,934 | 5/1989 | Ferrigno et al. | 428/678 |
| 5,066,459 | 11/1991 | Beltran et al. | 420/58.8 |
| 5,127,969 | 7/1992 | Sekhar | 148/23 |
| 5,156,321 | 10/1992 | Liburdi et al. | 228/119 |
| 5,320,690 | 6/1994 | Beltran et al. | 148/512 |
| 5,395,584 | 3/1995 | Berger et al. | 420/443 |
| 5,437,737 | 8/1995 | Draghi et al. | 148/23 |

OTHER PUBLICATIONS

*Engineered Materials Handbook*, vol. 1: Composites, ASM, Ohio, 1987, p. 896.

Primary Examiner—Kathryn L. Gorgos
Assistant Examiner—Chrisman D. Carroll
Attorney, Agent, or Firm—Andrew C. Hess; David L. Narciso

[57] ABSTRACT

A braze material is provided for repairing an article, and particularly components formed from cobalt and nickel-base superalloys, such as gas turbine engine components. The braze material is composed of high melt particles distributed within a braze alloy. The braze alloy can be any suitable bonding material of the type used to repair components that must operate at high temperatures. The particles are single crystal, directionally solidified or equiaxed particles formed from a superalloy or ceramic material, or mixtures thereof. Importantly, the particles have an aspect ratio (length to width) of at least 4:1. The braze material can be provided and used in the form of a slurry, a presintered preform, a plasticized tape, or in a powdered form.

8 Claims, 1 Drawing Sheet

HIGH TEMPERATURE BRAZE MATERIAL

This application is a Continuation of application Ser. No. 08/392,565, filed Feb. 23, 1995, now abandoned.

The Government has rights to this invention pursuant to Contract No. F33657-88C-2133 awarded by the Department of the Air Force.

The present invention relates to brazing materials for repairing components that must operate at high temperatures. More particularly, this invention relates to a braze material composed of a braze alloy with a dispersion of particles that have a high melting temperature and a length-to-width aspect ratio of at least about 4:1.

BACKGROUND OF THE INVENTION

High temperature cobalt-base and nickel-base superalloys are used in the manufacture of high temperature operating gas turbine engine components, including combustors and turbine vanes and blades. During the operation of such components under strenuous high temperature conditions, various types of damage or deterioration can occur. For example, cracks can result from thermal cycling and foreign object impact. In addition, such components can experience damage, such as cracks and inclusions during manufacture. Because the cost of components formed from high temperature cobalt and nickel-base superalloys is relatively high, it is typically more desirable to repair these components than to replace them.

Repair methods for components formed from superalloys have included vacuum brazing techniques with alloy powders or mixtures of powders, such as those described in U.S. Pat. No. 3,759,692 to Zelahy, U.S. Pat. No. 4,381,944 to Smith, Jr. et al, and U.S. Pat. No. 4,478,638 to Smith, Jr. et al. With the advent of higher strength and more highly alloyed superalloys, improved repair materials have been required, such as that taught by U.S. Pat. No. 4,830,934 to Ferrigno et al., assigned to the assignee of the present invention. Ferrigno et al. teach the use of an alloy powder mixture of equiaxed particles that results in a repair material characterized by high strength and a unique microstructure that is closely matched with the microstructure of the article being repaired.

While the repair material taught by Ferrigno et al. performs well with many high strength cobalt-base and nickel-base superalloys, further advancements in these types of alloys have resulted in the requirement for improved repair materials, particularly for the repair of single crystal (SX) and directionally solidified (DS) gas turbine engine components.

SUMMARY OF THE INVENTION

It is an object of this invention to provide an improved braze material for use in the repair of components formed from cobalt and nickel-base superalloys, and particularly for the repair of gas turbine engine components such as stator vanes, turbine blades and combustors.

It is a further object of this invention that such a braze material be in the form of fibers dispersed in a braze alloy whose melting temperature is less than that of the article being repaired.

It is another object of this invention that such fibers have a high melting temperature and serve as reinforcements and crack stoppers so as to enhance the article's resistance to thermal fatigue and stress rupture.

It is yet another object of this invention that the fibers impart localized anisotropy within the braze alloy so as to enhance the mechanical properties of the braze material.

In accordance with a preferred embodiment of this invention, these and other objects and advantages are accomplished as follows.

According to the present invention, there is provided a braze material for repairing an article, and particularly components formed from cobalt and nickel-base superalloys, such as gas turbine engine components. The braze material is composed of particles distributed within a braze alloy. The braze alloy can be any suitable bonding material of the type used to repair components that must operate at high temperatures. The particles have microstructures that are single crystal, directionally solidified or equiaxed, are formed from a superalloy, ceramic material, or mixtures thereof, and have a melting temperature that approaches or exceeds that of the material from which the component to be repaired is formed. Importantly, the particles have an aspect ratio (length to width) of at least about 4:1 in order to contribute sufficient anisotropy to the braze material, and thereby yield mechanical properties that approach single crystal properties.

The braze material can be provided and used in the form of a presintered preform, a plasticized tape, or in a powdered form. In the powdered form, the braze material is further composed of a binder that forms a slurry with the powder. The binder serves to adhere the particles and bonding alloy together, as well as adheres the particles and bonding alloy to the article to be repaired. In the form of a presintered preform or plasticized tape, the braze material is particularly suited to build up a void or worn area on an article.

According to this invention, a method for repairing a superalloy article includes preparing the braze material in accordance with the above. The braze material is then used to fill a void or crack in the superalloy article, after which the article is heated so as to cause the braze material to flow and fill the void. The heating step is conducted at an appropriate temperature to maintain the microstructure of the article, particularly if the article has a single crystal or directionally solidified microstructure.

A significant advantage of the present invention is that the particles serve as reinforcements and/or crack stoppers, and thereby enhance the article's resistance to thermal fatigue, which is a typical failure mode for components that must operate at temperatures seen in gas turbine engines. The composition of the braze material yields a repair portion whose mechanical properties are enhanced by the particles to a level that is superior to that of prior art repair materials. If single crystal or directionally solidified particles are used, the corresponding mechanical properties associated with such microstructures are maintained, such that localized anisotropy exists within the isotropic matrix of the bonding alloy. Accordingly, localized anisotropic mechanical properties are developed in the repair portion. The anisotropy of the particles allow the braze material to have crack blunting or stopping characteristics, in addition to the inherent property of the braze alloy to metallurgically bond the particles to each other and to the article. As a result, components repaired with the braze material of this invention are capable of exhibiting enhanced mechanical properties within a wide range of temperatures, including temperatures of at least about 2000° F.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
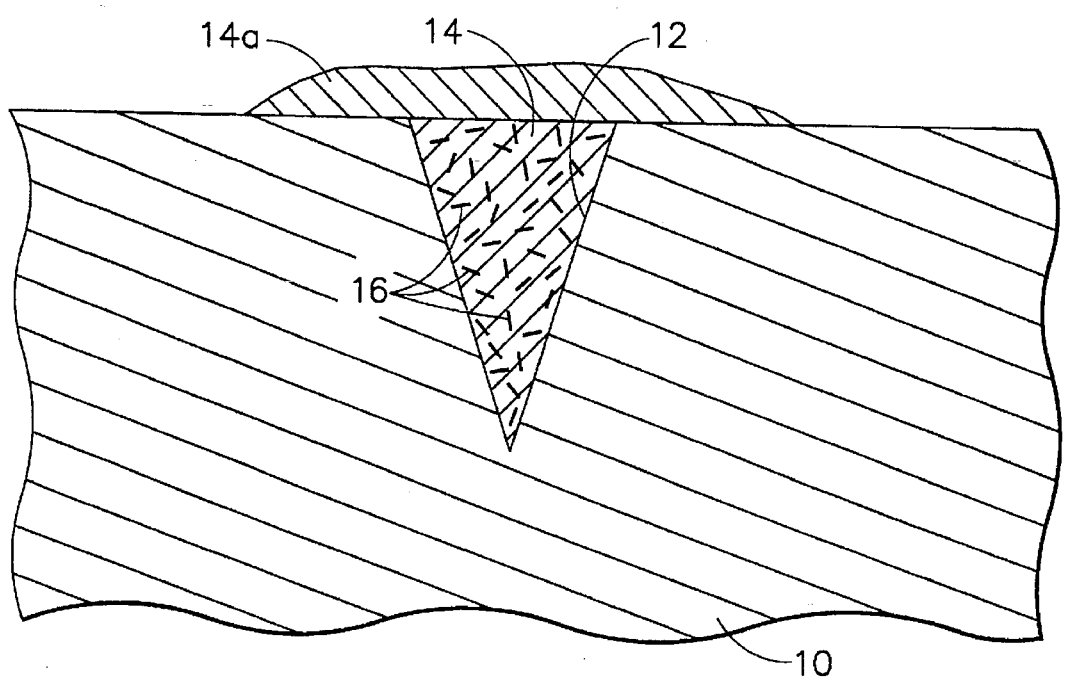
FIG. 1 is a cross-sectional view of a component that has been repaired with the braze material of this invention.

The present invention provides a braze material that is suitable for repairing components that must operate at elevated temperatures, and particularly cobalt and nickel-base superalloy components of gas turbine engines, including stator vanes, turbine blades and combustors. For use in a gas turbine engine, such components will often be cast as a single crystal or directionally solidified casting to promote the high temperature properties of the component. The braze material is particularly suited for repairing voids and cracks in such superalloy components, as represented in FIG. 1.

Generally, FIG. 1 illustrates a crack 12 in the surface of a component 10. Such cracks 12 can be formed in various manners, including thermal cycling and the impact of a foreign object. Furthermore, components of gas turbine engines are exposed to a hostile environment which gradually erodes the components, and will crack or form undesirable voids in the surface of the component as a result of oxidation. The braze material of this invention is employed to fill the crack 12, forming a repair portion 14 that completely fills and bonds to the crack 12.

The composition of the braze material includes particles 16 having a high melting temperature, such that the particles 16 do not melt during the brazing operation in which the braze material flows to completely fill the crack 12. For this reason, the particles 16 are formed from a superalloy, ceramic, or mixtures thereof. If using a superalloy component, such a braze material will not adversely react with the superalloy. A preferred superalloy is Rene 125, having a nominal composition in weight percent as follows: 10 percent cobalt, 8.9 percent chromium, 4.8 percent aluminum, 2.5 percent titanium, 2.0 percent molybdenum, 3.8 percent tantalum, 7 percent tungsten, 1.55 percent hafnium, with the balance being nickel and minor elements. Rene 125 is preferred for its stress rupture properties, though it is foreseeable that other nickel-base superalloys could be used. Nickel-base superalloy particles can be coated with tantala ($Ta_2O_5$) or another ceramic coating to ensure the preservation of their fiber structure.

Preferred ceramics from which the particles can be formed include tantala, hafnia ($HfO_2$), silicon carbide (SiC) and others of the type used in ceramic and metal matrix composites. A titanium nitride coating may be used to reduce the reactivity of silicon carbide fibers. Lighter ceramics such as alumina ($Al_2O_3$) are generally undesirable as the particles tend to float in the molten braze material during brazing.

The high melt particles are homogeneously dispersed in a braze alloy that preferably constitutes the majority of the braze material. Suitable braze alloys include nickel and cobalt-base braze alloy systems of the type known in the art for repairing high temperature components. As is conventional, the braze alloy must be metallurgically compatible with the component to be repaired, and have a melting temperature that is less than the temperature at which the component could be adversely effected.

According to this invention, the particles dispersed within the braze alloy advantageously serve to blunt and/or stop the propagation of cracks and voids in the component. For this purpose, the particles preferably have anisotropic microstructures, such that particles impart localized anisotropy to the braze material, which is otherwise isotropic as a result of the braze alloy. Therefore, the particles have single crystal or directionally solidified crystallographic structures, or are equiaxed particles that impart localized anisotropy in the way the particles are able to deflect or stop a crack. Notably, a quantity of particles used to form the braze material of this invention may include single crystal, directionally solidified and equiaxed particles. Importantly, the particles have a length to width aspect ratio of at least about 4:1, so as to generally be characterized as a fiber, in order to contribute sufficient anisotropy to the braze material, and thereby yield mechanical properties that approach single crystal properties. The particles may be submicron in size, with a preferred size range being dependent on the composition of the particles. For example, excessively fine ceramic particles may tend to dissolve or be consumed by the bonding alloy, resulting in a nonhomogeneous composite.

The braze material can be provided and used in the form of a solid, a slurry, a presintered preform, or a plasticized tape, each of which will generally involve a mixture of the fibers and powdered bonding alloy. The fibers and bonding alloy powder can be formed to have a variety of shapes, such as spherical or cylindrical, in order to achieve optimum green packing density within the crack prior to brazing. In this form, the "green" braze material may be sized and shaped to completely fill the crack 12 shown in FIG. 1. When combined with a suitable binder, the green braze material can also be formed to be sufficiently solid and rigid to allow handling. Such binders are well known in the industry, and would generally include any commercially available, environmentally safe braze binder. In addition to the above, the braze material could be applied by other techniques, including flashing the crack with the braze alloy, applying the particles, capping with the braze alloy, and then performing a brazing and diffusion step in which the particles are dispersed in the braze alloy and the braze alloy flows to fill the crack.

According to this invention, a method for repairing a superalloy component includes preparing the braze material in accordance with any of the above methods. The method is tailored to ensure that the molten braze material will fill the crack or void, yielding a repair portion characterized by a combination of isotropic and localized anisotropic mechanical properties, as determined by the localized anisotropy imparted by the particles within the isotropic bonding alloy, resulting in mechanical properties that are superior to prior art materials and that approach single crystal base metal properties. The braze material and the component are heated to a temperature that is sufficient to melt and flow the braze alloy, but also sufficiently low so as to maintain the microstructure of the component, particularly if the component has a single crystal or directionally solidified microstructure. After brazing, any excess braze material 14a (FIG. 1) can be removed by conventional grinding methods.

In view of the above, it can be appreciated that a significant advantage of the present invention is that a braze material with a dispersion of particles having a high melting temperature and localized anisotropic properties are capable of serving as reinforcements and/or crack stoppers for high temperature components. As such, the braze material is able to enhance the component's resistance to thermal fatigue, which is a typical failure mode for components that must operate at high temperatures. The composition of the braze material yields a repair portion whose mechanical properties and oxidation resistance are superior to that of prior art repair materials.

In addition, the brazing operation is conducted such that the localized anisotropy imparted by the particles enhances the overall isotropic mechanical properties associated with the bonding alloy. The anisotropy of the particles allows the braze material to have crack blunting or stopping characteristics, in addition to the inherent property of the braze alloy to metallurgically bond the particles to each other and to the component. As a result, components repaired with the braze material of this invention are capable of exhibiting enhanced mechanical properties that are superior to prior art materials and approach single crystal properties, within a wide range of temperatures, including temperatures of at least about 2000° F.

Another significant advantage is that the braze material of this invention is compatible with conventional brazing methods, such that substantially conventional processing techniques can be employed to repair a component.

While our invention has been described in terms of a preferred embodiment, it is apparent that other forms could be adopted by one skilled in the art. For example, the physical configuration of the braze material could vary considerably, other braze alloys could be used, and the braze material could be used in brazing operations which differ substantially from that noted here. Therefore, the scope of our invention is to be limited only by the following claims.

The embodiments of the invention in which an exclusive property or privilege is claimed are defined as follows:

1. A superalloy article in which a crack or void has been repaired with a braze material, the article having a microstructure that is selected from the group consisting of single crystal and directionally solidified, the braze material comprising a nickel or cobalt-base braze alloy and fibers randomly distributed within the braze alloy, the braze material having an isotropic matrix formed by the braze alloy, which constitutes a majority of the braze material, the fibers having an aspect ratio of at least 4:1 and anisotropic microstructures chosen from the group consisting of single crystal, directionally solidified or equiaxed microstructures so as to impart sufficient localized anisotropy in the isotropic matrix of the braze material to blunt propagation of cracks and voids in the superalloy article, the fibers being formed from a material selected from the group consisting of superalloys, tantala, hafnia, silicon carbide and mixtures thereof.

2. A superalloy article as recited in claim 1 wherein the fibers have a maximum dimension of less than one micrometer.

3. A superalloy article as recited in claim 1 wherein the fibers are composed of a superalloy having a nominal composition of 10 weight percent cobalt, 8.9 weight percent chromium, 4.8 weight percent aluminum, 2.5 weight percent titanium, 2.0 weight percent molybdenum, 3.8 weight percent tantalum, 7 weight percent tungsten, 1.55 weight percent hafnium with the balance being nickel and minor elements.

4. A method for repairing a superalloy article, the method comprising the steps of:

preparing a braze material comprising a nickel or cobalt-base braze alloy and fibers randomly distributed within the braze alloy, the braze alloy constituting a majority of the braze material the fibers having an aspect ratio of at least 4:1 and anisotropic microstructures chosen from the group consisting of single crystal, directionally solidified or equiaxed microstructures so as to impart sufficient localized anisotropy in the braze material to blunt propagation of cracks and voids in the superalloy article, the fibers being formed from a material selected from the group consisting of superalloys, ceramics and mixtures thereof;

selectively filling a void in the superalloy article with the braze material; and heating the superalloy article to a temperature sufficient to cause the braze material to flow and fill the void without causing a microstructural change in the superalloy article, the fibers defining localized anisotropic regions within an isotropic matrix formed by the braze alloy.

5. A method as recited in claim 4 wherein the braze material is suspended in a liquid vehicle so as to be a slurry.

6. A method as recited in claim 4 wherein the fibers have a maximum dimension of less than one micrometer.

7. A method as recited in claim 4 wherein the fibers are tantala fibers.

8. A method as recited in claim 4 wherein the fibers are composed of a superalloy having a nominal composition of 10 weight percent cobalt, 8.9 weight percent chromium, 4.8 weight percent aluminum, 2.5 weight percent titanium, 2.0 weight percent molybdenum, 3.8 weight percent tantalum, 7 weight percent tungsten, 1.55 weight percent hafnium with the balance being nickel and minor elements.

* * * * *